(12) United States Patent
Leisinger et al.

(10) Patent No.: US 6,223,377 B1
(45) Date of Patent: May 1, 2001

(54) DEVICE FOR CLEANING AN ELONGATED RECORD MEDIUM

(75) Inventors: Hans Leisinger, Winnetka; George J. Rowland, Simi Valley; Colin F. Mossman, Los Angeles, all of CA (US)

(73) Assignee: Deluxe Laboratories, Inc., Los Angeles, CA (US)

( * ) Notice: Subject to any disclaimer, the term of this patent is extended or adjusted under 35 U.S.C. 154(b) by 0 days.

(21) Appl. No.: 09/035,934

(22) Filed: Mar. 2, 1998

(51) Int. Cl.⁷ ........................................ A47L 5/38
(52) U.S. Cl. .................. 15/100; 15/1.51; 15/308; 15/309.1
(58) Field of Search ................ 15/1.51, 77, 100, 15/102, 302, 303, 306.1, 308, 309.1, 309.2, 88.2

(56) References Cited

U.S. PATENT DOCUMENTS

| | | | | |
|---|---|---|---|---|
| 1,401,012 | * | 12/1921 | Teitel ............................ | 15/100 |
| 2,289,753 | * | 7/1942 | Capstaff ......................... | 15/100 |
| 3,737,941 | * | 6/1973 | Miller et al. ................... | 15/100 |
| 4,244,078 | * | 1/1981 | Hughes et al. ................. | 15/302 |
| 4,751,759 | * | 6/1988 | Zoell ............................. | 15/1.51 |
| 5,059,996 | * | 10/1991 | Bailey ........................... | 15/100 |
| 5,490,300 | * | 2/1996 | Horn .............................. | 15/1.51 |

\* cited by examiner

*Primary Examiner*—Terrence R. Till
(74) *Attorney, Agent, or Firm*—Kramer Levin Naftalis & Frankel LLP; Gregor N. Neff

(57) ABSTRACT

The device sprays a mist of cleaning fluid onto the record medium—e.g., motion picture film—and wipes it off, preferably with a soft material such as velvet. Then, the film is dried with air, including thin air jets to spread the liquid evenly, and heated, ionized air. The device has a closed housing and air in the housing is evacuated and sent to a still to recover much of the cleaning liquid and prevent its escape into the atmosphere.

27 Claims, 3 Drawing Sheets

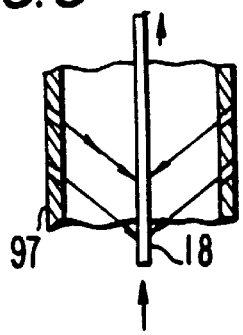
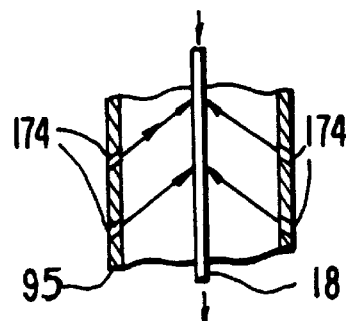
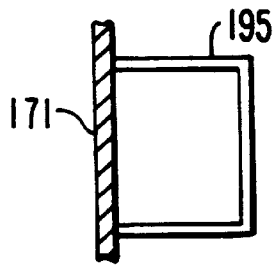
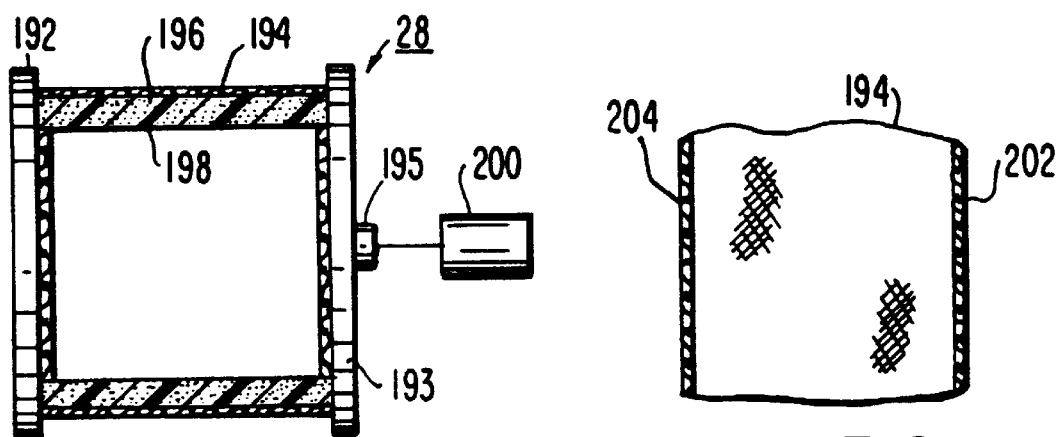
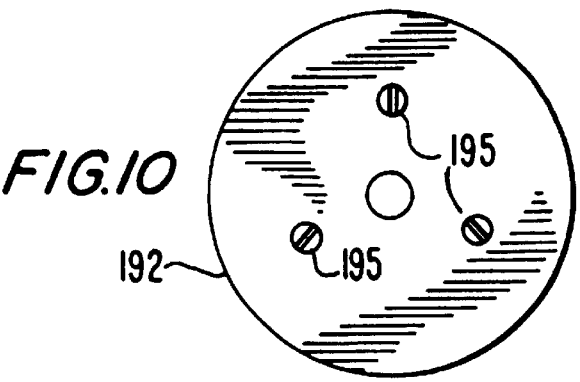

DEVICE FOR CLEANING AN ELONGATED RECORD MEDIUM

This invention relates to devices and methods for cleaning an elongated record medium, and particularly to devices and methods for cleaning motion picture film.

In the cleaning of motion picture film, some of the problems that exist are that existing equipment and methods often are too slow, they often use too much expensive cleaning liquid, and sometimes they create noxious odors and emissions.

It is an object of this invention to eliminate or alleviate the foregoing problems.

More specifically, it is an object of the present invention to provide a cleaning device and method which cleans an elongated record medium such as motion picture film at a relatively high speed.

It is another object of the invention to provide such a device and method which utilizes relatively small quantities of cleaning liquid.

It is a further object of the invention to provide such a device and method which leave the record medium very clean and do not scratch or otherwise damage its surface.

It is an additional object of the invention to provide such a device and method in which the emission of fumes is greatly reduced or eliminated.

In accordance with the present invention, the foregoing objectives are met by the provision of a device and method in which a liquid solvent is sprayed onto the surface of the record medium, and then wiped off and the surface of the record medium is dried.

Preferably, the spray is a mist and the amount sprayed onto the film is relatively small. The record medium or film is dried by the use of a heated air stream.

It also is preferred that, prior to drying, thin jets of air are used to spread the liquid solvent on the surface of the motion picture film evenly, thereby avoiding streaking and spotting.

It also is preferred that the record medium or film be treated with a stream of ionized air to reduce or eliminate static electricity which might attract dirt and dust particles. The air stream preferably is heated to simultaneously dry and ionize the record medium.

Another preferred feature of the invention is the provision of a blower and vacuum combination which are used to clean dirt particles from the sprocket holes of motion picture film.

A further feature of the invention is the enclosure of the cleaning device in a closed housing, removing air from the housing through a vacuum system, and sending the solvent-laden air to a still to recover solvent. This arrangement not only reduces usage of the solvent, but it also greatly reduces or eliminates noxious odors and emissions from the cleaning device into the air surrounding it.

It also is preferred that the device used for wiping the film after it is sprayed is a rotary buffing wheel with a soft, replaceable velvet surface.

The foregoing and other objects and advantages of the invention are set forth in or will be apparent from the following descriptions and drawings.

IN THE DRAWINGS

FIGS. 5 and 6 are cross-sectional views of portions of the structure shown in FIGS. 1 and 4;

FIG. 7 is a top plan view of a component of the structure shown in FIGS. 1 and 4;

FIG. 8 is a partially cross-sectional, partially schematic view of one of the buffing wheels shown in FIG. 1;

FIG. 9 is a front elevation view of a component of the buffing wheel of FIGS. 1 and 8; and FIG. 10 is a left end elevation view of the buffing wheel shown in FIG. 8.

GENERAL DESCRIPTION

Figure 1:
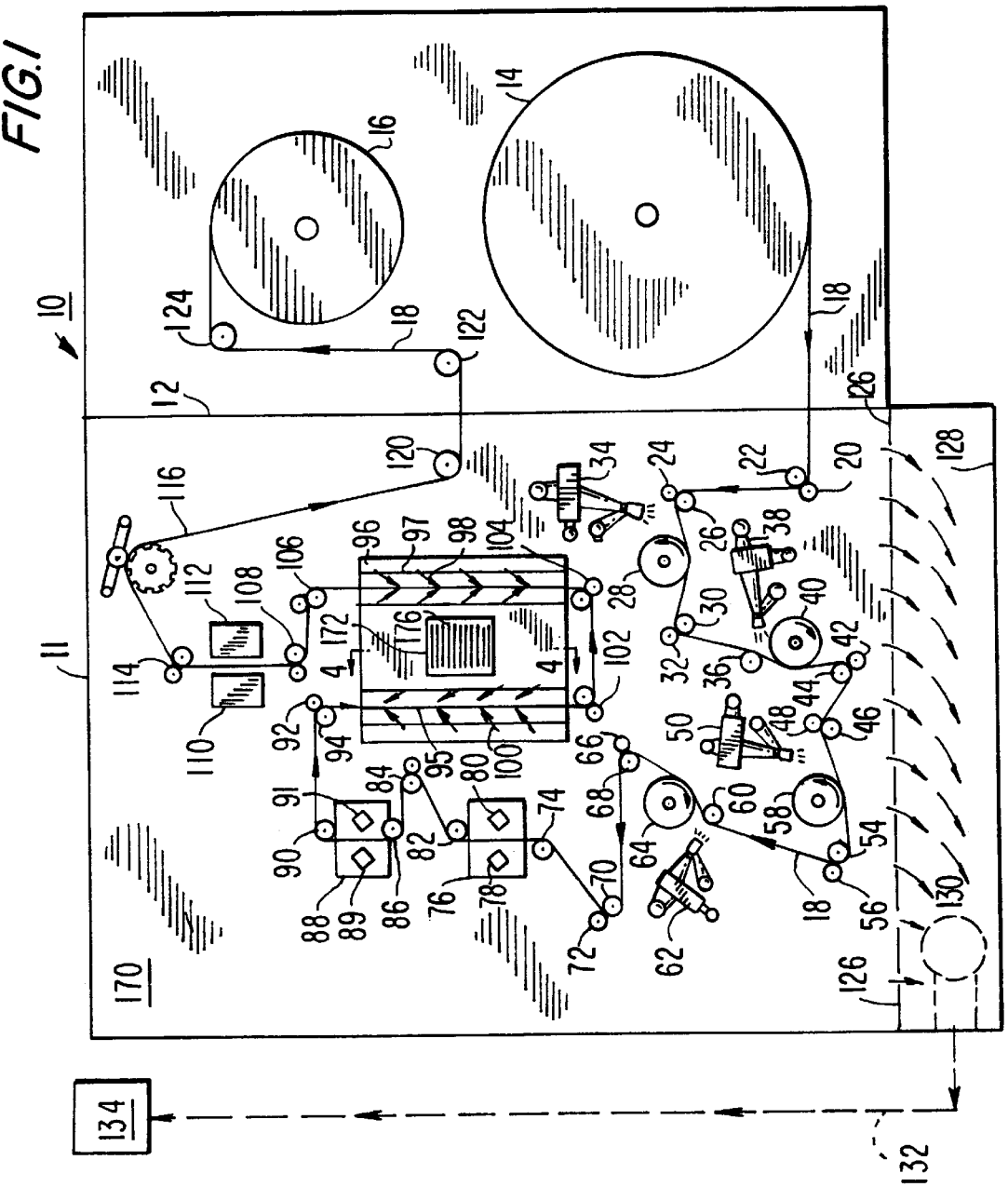
FIG. 1 is front elevation view, partially schematic, of a cleaning device constructed in accordance with the present invention.

The preferred cleaning device of the present invention is indicated generally at 10 in FIG. 1.

The cleaning device 10 includes a housing 11 separated into two compartments by a vertical wall 12. The housing 11 preferably is air tight, or nearly so, so as to keep any noxious fumes within the housing where they can be removed by an evacuation system to be described below. The front of the housing 10 preferably has transparent front hinged doors.

In the right-hand compartment of the housing is located a reel 14 which is rotatably mounted in the housing and stores motion picture film to be cleaned; that is, dirty film. Clean film is stored in a roll 16, which is driven by a motor (not shown) to take up the film which has been cleaned.

Film 18 to be cleaned passes through a restricted opening in the wall 12 to the cleaning mechanism which is in the left-hand compartment. It is pulled from the reel 14 by means of the sprocket wheel 116 in the upper portion of the cabinet.

The film 18 passes through a pair of guide rollers 20 and 22, and another pair of guide rollers 24 and 26 to a first location at which a liquid cleaning material is sprayed onto the upper surface of the film by a first sprayer 34. Three other sprayers 38, 50 and 62 also are provided for spraying solvent onto the film.

Each of these sprayers preferably is an ordinary artist's air brush which is set and adjusted to produce a fine mist of liquid solvent such as perchloroethylene which is sprayed sparingly on the surface of the film.

Near the location at which cleaning solution is sprayed on the upper surface of the film is a first buffing wheel 28. There are three other buffing wheels 40, 58 and 64, each of which also is located closely following one of the sprayers.

Each of the buffing wheels 28, 40, 52 and 64 has a soft, absorbent surface such as that provided by velvet sleeve which contacts the film. Each buffing wheel is rotated in a counterclockwise direction so that its surface moves in a direction opposite to the movement of the film.

The surface of each of the velvet sleeves on the buffing wheels removes dirt which is loosened by the solvent. After a certain period of use, the velvet becomes dirty, and the sleeve can be replaced with a clean one.

After the film moves past the first buffing wheel 28, it passes between rollers 30 and 32, and a roller 36 opposite a point where the underside of the film is sprayed by the sprayer 38. Then, the buffing wheel 40 buffs the undersurface of the film to remove dirt.

The film then passes through guide rollers 42 and 44 and 46 and 48 to a third location where solvent is sprayed on the upper surface of the film for a second time, by the sprayer 50. The buffing wheel 58 then buffs the upper surface of the film for a second time.

The film then passes between guide rollers 54 and 56, and over roller 60, to a fourth location at which the underside of the film is sprayed a second time by the sprayer 62. The underside then is buffed by the buffing wheel 64.

The first two buffing wheels 28 and 40 serve to remove most of the dirt from the film, and the buffing wheels 58 and 64 remove the remainder.

After leaving the sprayers and buffing wheels, the film passes between guide rollers 66 and 68 and 70 and 72 and 74 upwardly through the first of two so-called "air knives" 76 and 88. The first of the air knives 76 has air spraying heads 78 and 80 which deliver very thin jets of air extending across the width of the film against both sides of the film, as it will explained in greater detail in connection with FIG. 2 of the drawings. These thin jets of air tend to smooth out any liquid cleaning material on the film, making the liquid coating relatively uniform and promoting uniform drying.

The film passes upwardly over guide rollers 82, 84 and 86 to the second air knife 88 where the air sprayers 89 and 91 deliver a second thin jet of air across the film for providing a final smoothing of any liquid coating remaining on the motion picture film.

Next, the film passes over guide rollers 90, 92 and 94 to a drying unit 96.

The film passes downwardly through a first slotted conduit 95 in the drying unit, downwardly out of the heating unit 96 through guide roller pairs 102 and 104, and upwardly through a second slotted conduit 97. As it will be explained in greater detail below, each of the slotted conduits 95 and 97 delivers plural jets of heated, ionized air, as indicated at 98 and 100 in a direction counter to the movement of the film to dry and ionize the film to remove static electricity.

After leaving the drier, the film passes through guide roller pairs 106 and 108 upwardly past a blower 112 on one side of the film, and a vacuum device 110 on the opposite side of the film. The blower 112 blows ionized air towards the film, and the vacuum device 110 carries the air away. This serves to clean out any dust particles which might remain in the sprocket holes of the film, and further reduce static electricity.

The film now moves upwardly through the guide roller pair 114 over the sprocket wheel 116, which pulls the film through the cleaning system, downwardly over a guide roller 120, passing through a restricted opening in the wall 112, over guide rollers 122 and 124, and onto the roll 16.

Any overspray from the sprayers and fumes caused by evaporation of the cleaning liquid are kept within the housing 11 and are drawn downwardly through a grille 126 in the bottom of the left hand compartment, as indicated by the arrows near the bottom of the housing. The fumes and air from within the housing enter an airtight compartment 128 from which the air is exhausted through a hole 130 by a suitable vacuum source, such as the "house" vacuum source which commonly is available in industrial facilities. The air and fumes then are delivered through an exhaust conduit 132 to a still 134 of a known variety which recaptures the liquid entrained in the air. By this means, up to 80% of the cleaning liquid is recovered.

This feature of the invention is doubly advantageous in that it greatly reduces the usage of cleaning liquids, such as percholoroethylene, and simultaneously largely or entirely prevents any unpleasant fumes from escaping into the surrounding atmosphere.

The cleaning device 10 is capable of operating at very high speeds. For example, a speed in excess of 250 feet per minute is readily available when cleaning motion picture film. This is believed to be around three times faster than some of the most widely used prior art cleaning devices.

Although most motion picture film is made of polyester, the device 10 is versatile, in that it can be used to clean elongated record media other than motion picture film. It can be used with a variety of different cleaning solutions. However, it is used to best advantage with relatively slow-drying liquids such as percholoroethylene.

The invention can be used to clean a wide variety of different types of film, in various forms. For example, it can be used to clean raw film stock, negative film, both that bearing picture images, and that bearing sound only, as well as fully developed film, that is, release prints with both picture and sound information recorded on it.

Air Knives

Although the air knives 76 and 88 are known for use in film cleaning, their operation will be explained in some detail, with reference to FIG. 2.

Figure 2:
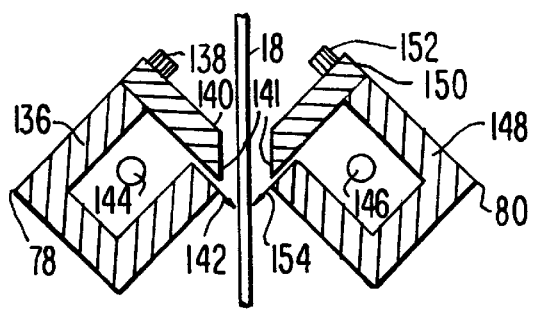
FIG. 2 is a cross-sectional view of one of the "air knife" devices shown in FIG. 1.

FIG. 2 is a cross-section taken through two metal tubes 78 and 80. Each of the tubes 78 and 80 has a wall 136 or 148, with a top plate 140 or 150, and fasteners 138 or 152 attaching the top plate 150 or 140 to the body of the tube.

A hole 144 or 146 allows the entry of pressurized air into the tube.

Each tube has a very narrow slit 141 whose width is only 0.002 inches (two thousandths of an inch). The tubes 78 and 80 are mounted so that the slots 148 create very thin air streams pointed downwardly at a angle of about 45° with the film 18. The slit 141 extends across the full width of the film.

As noted above, these thin air streams tend to smooth out any liquid on each surface of the film so as to minimize streaking, spotting or mottling when the film passes through the dryer 96.

Sprayers and Spray Control

Figure 3:
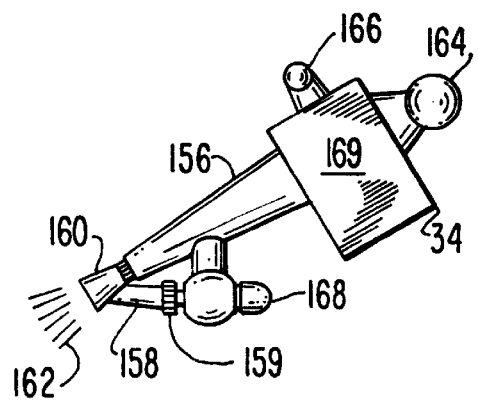
FIG. 3 is an enlarged front elevation view of one of the spraying devices used in FIG. 1.

FIG. 3 is a front elevation view of one of the sprayers 34 shown in FIG. 1. It is an ordinary artist's air brush sprayer, modified so as to enable it to be mounted on the back panel 170 of the structure shown in FIG. 1 and supplied with liquid solvent and pressurized air.

Although the air brushes can be one of a variety of brands, the air brushes which have been used in a successfully tested embodiment of the invention are sold under the trademark Paasche by the Paasche Air Brush Company of Harwood Heights, Ill. It is called a "single-action, external mix air brush".

Cleaning liquid is supplied from a liquid supply tank (not shown) behind the back panel 170 through a hole in the back panel and an inlet conduit 168 to an injection nozzle 158 having a needle valve 159. By turning the knob 159, the needle valve within the structure 158 controls the amount of liquid being sprayed. The sprayer also has a body 156 and a tip 160 through which air flows. A fine mist 162 is produced at the outlet.

A manifold 169 is provided, with an air inlet tube 166 entering the manifold to supply air at around 15 to 30 psi, and a mounting post 164 secures the sprayer to the back panel 170.

The amount of liquid to be sprayed onto the film is set at about the minimum amount that will provide sufficient lubricity to prevent scratching by the buffing wheels. The amount of liquid preferably is less than that which causes the liquid to "run".

The manner in which the spray level is set for a particular film to be cleaned is that a sample of the film is run through the cleaning system with the spray set at a given level. If the level is too low, minute scratches will appear on the film. Then, the amount of liquid is increased until, on a test sample, the scratches do not appear any more.

Buffing Wheels

FIG. 8 shows one of the buffing wheels, partly in cross-section. The wheel includes an inner hub 198 with a layer of sponge 196 wrapped around it, and a velvet sleeve 194 on the surface of the sponge.

The buffing wheel 28 has a pair of flanges, a front flange 192 and a rear flange 193. It has a drive shaft 195 which is rotated by a drive motor, shown schematically at 200, which is mounted on the rear side of the back panel 170.

FIG. 9 shows the velvet sleeve 194. It consists of a sleeve made out of velvet material which is "bi-directional". That is, the very soft bristles of the material are as effective in brushing in one direction as in the other, so that it does not matter which end of the sleeve is slipped onto the buffing wheel first. The velvet fibers tend to softly brush the surface of the film to remove dirt particles loosened by the cleaning liquid.

Elastic bands 202 and 204 are located at the ends of the sleeve to hold it onto the sponge support surface.

In replacing the sleeves, three screws 195 (FIG. 10) are removed to remove the outer flange 192 so that the old sleeve can be removed and replaced with a clean one, and the flange 192 is replaced.

The sponge is provided primarily for its cushioning effect.

Surprisingly, the velvet sleeve usually does not become saturated with liquid during the normal operation of the cleaning device 10. This also applies to the sponge material 196. One reason for this is that cleaning liquid applied to the film very sparingly.

Dryer

Figure 4:
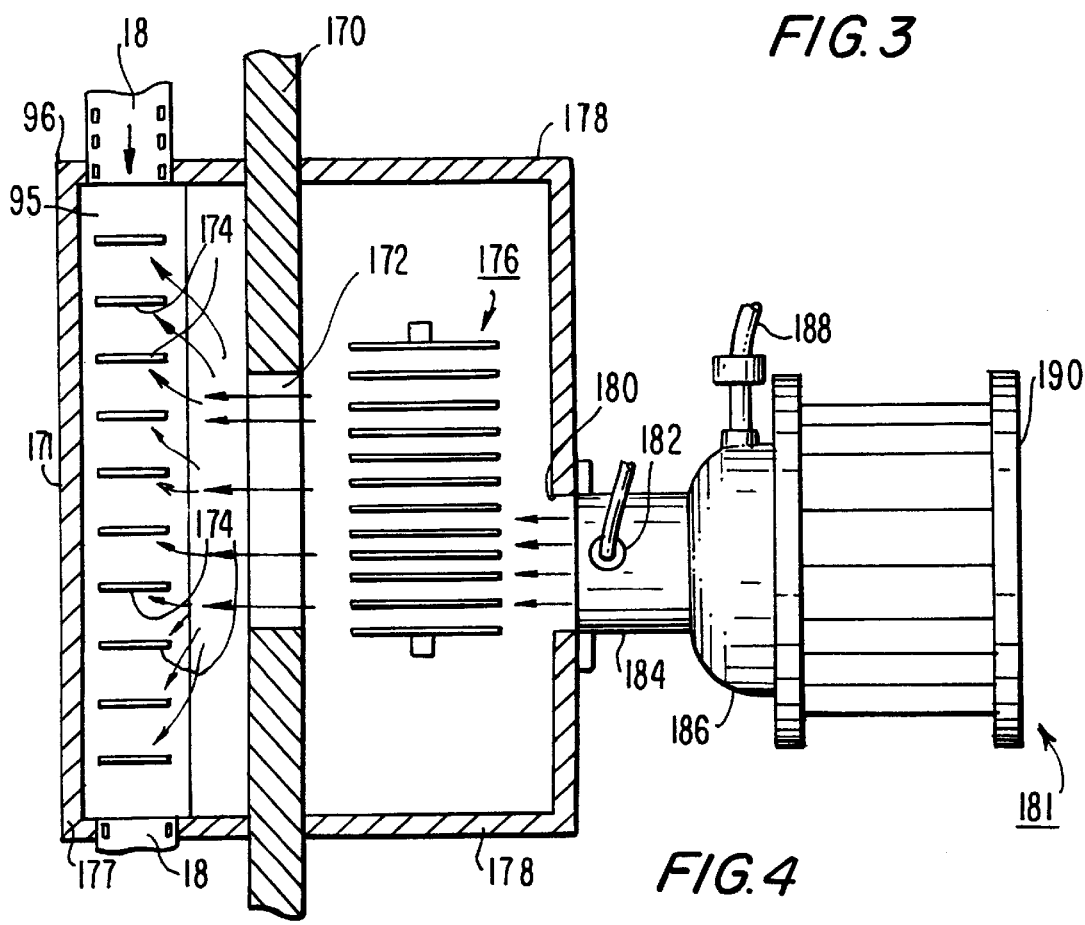
FIG. 4 is a cross-sectional, partially schematic and partially broken-away view taken along line 4—4 of FIG. 1.

The dryer 96 of the invention is shown in cross-section in FIG. 4, as well as in a front elevation view in FIG. 1. It includes a first housing 177 which is generally air tight, with the exception of restricted inlet and outlet openings for the film to pass through, and an air inlet opening 172. The housing 177 is secured to the front of the panel 170. Preferably, it has a transparent front cover 171.

The drying device also includes a rear housing 178 mounted on the rear of the panel 170 in communication with the housing 177 through the large rectangular inlet opening 172 (also see FIG. 1).

Only one of the vertical slotted conduits 95 and 97 is shown in FIG. 4. A top plan view of the element 95 also is shown in FIG. 7. As it can be seen, it is metal channel with a plurality of slots 174 cut in both side walls (also see FIG. 6). The slots are slanted upwardly as shown in FIG. 6 so as to create air jets which impinge against the film 18 in a direction opposite to the direction of movement of the film. Similarly, as it is shown in FIG. 5, the slots in the side walls of the conduit 97 are angled downwardly so as to impinge against the film 18 in a direction opposite to its movement. This maximizes the drying action of the dryer.

As it can be seen in FIG. 7, the open sides of the channels 95 and 97 abut against the front panel 171 of the housing 177 so as to close the channel and form a conduit which is open only at its ends and through the air slots in its sides.

Referring again to FIG. 4, an electrical resistance heater 176 is provided in the housing 178 behind the opening 172 to heat air produced by an air supply indicated generally at 181.

The air supply includes a conduit 184 connected to deliver air through an opening 180 in the housing 178 flowing towards the heating element 176.

In the side of the conduit 184 is an electrical ionizing element 182 of known construction. The air supply includes an "air amplifier" 186 which is supplied with compressed air through an inlet 188 and takes in atmospheric air through an air filter 190.

The air amplifier 186 is of a known construction which uses compressed air to create an amplified volume of air flowing at a substantial velocity through the outlet conduit 184. It is sometimes referred to as an "air cannon", when used in combination with the ionizer 182.

The device 181 is a known device which typically is used to deliver ionized air for use in painting automobiles or other industrial applications.

The air delivered by the device 180 is heated by the heating elements 176 and flows through the opening 172 to the housing 177, and then through the slots 174 to impinge against and dry the film 18.

The temperature to which the air is heated is variable and can be selected to give the maximum amount of drying without heating the film or other record medium to a temperature so high that the medium is damaged.

Although it is believed that prior cleaning devices have used ionization to reduce static electricity in the film, it is believed that this has been done in the past by a combination of electric fields with brushes. This is disadvantageous, because the brushes tend to scratch the film. In the present invention, by contrast, there is no mechanical brushing of the film. Instead, only air is used to dislodge particles released by the ionization process.

A second ionization process occurs within the blower 112, and this can be done by ionizing the air as with the device 181. Once again, if any static electricity has built up in the film, it is reduced or eliminated by the ionized air. Then, the vacuum device removes the particles from the film, and particularly the sprocket holes in the film.

The result is very clean film which has been cleaned at a very high rate of speed.

It should not be assumed that the specific rates of speed mentioned above constitute an upper limit for the speed attainable with the cleaning device and method of the present invention. It is believed that much higher speeds can be attained so that, for example, negative film being used in the printing of release prints of a motion picture film can be cleaned "on-the-fly". That is, while it is running at speeds of 1,500 feet per minute or even faster.

Similarly, it is believed that raw film stock, release prints and other such media can be cleaned at similarly high speeds.

The above description of the invention is intended to be illustrative and not limiting. Various changes or modifications in the embodiments described may occur to those skilled in the art. These can be made without departing from the spirit or scope of the invention.

What is claimed is:

1. A device for cleaning a thin elongated flexible record medium, said device comprising, in combination:
   a sprayer for spraying a liquid solvent onto one surface of a moving elongated substantially dry flexible record medium at a first location,
   adjustable liquid flow control means for said sprayer,
   a wiping device for wiping said one surface of said record medium at a second location adjacent said first location, and drive means for driving said record medium sequentially past said first and second locations.

2. A device as in claim 1 including a dryer having a blower for blowing heated air onto said record medium at a third location following said first and second locations.

3. A device as in claim 1 in which said record medium is motion picture film.

4. A device as in claim 1 in which said sprayer produces a mist and produces minimal wetting of the surface of said film.

5. A device as in claim 1 in which said wiping device comprises a wheel having a soft, absorbent surface, and drive means for rotating said wheel against said record medium to move its surface in a direction opposite to the direction of movement of said record medium.

6. A device as in claim 5 in which said wheel comprises a reel with a hub and an easily replaceable velvet cover on said hub forming said soft, absorbent surface.

7. A device as in claim 1, said record medium being motion picture film having two opposed sides and including at least two of said sprayers, one for spraying solvent onto each of said sides of said film, and at least two of said wiping devices, each one being located adjacent one of said sprayers and contacting said film after one of said sprayers.

8. A device as in claim 7 including at least four of said sprayers and wiping devices, two acting upon one of said film surfaces and two on the other of said film surfaces.

9. A device as in claim 1 in which said solvent is perchloroethylene.

10. A device for cleaning a thin elongated flexible record medium, said device comprising, in combination:
   a sprayer for spraying a liquid solvent onto a moving elongated flexible record medium at a first location,
   a wiping device for wiping said medium at a second location,
   drive means for driving said record medium sequentially past said first and second locations and a dryer for blowing ionized air onto said one surface of said medium at a third location.

11. A device as in claim 10 including a heater for heating said ionized air before it contacts said medium.

12. A device for cleaning a thin elongated flexible record medium, said device comprising, in combination:
   a sprayer for spraying a liquid solvent onto a moving elongated flexible record medium at a first location,
   a wiping device for wiping said medium at a second location,
   drive means for driving said record medium sequentially past said first and second locations,
   in which said wiping device comprises a wheel having a soft, absorbent surface, and drive means for rotating said wheel against said record medium to move its surface in a direction opposite to the direction of movement of said record medium,
   in which said wheel comprises a reel with a hub and an easily replaceable velvet cover on said hub forming said soft, absorbent surface, and
   including a layer of sponge material between the outer surface of said hub and said cover.

13. A device for cleaning a thin elongated flexible record medium, said device comprising, in combination:
   a sprayer for spraying a liquid solvent onto a moving elongated flexible record medium at a first location,
   a wiping device for wiping said medium at a second location,
   drive means for driving said record medium sequentially past said first and second locations, and
   in which said wiping device comprises a wheel having a soft, absorbent surface, and drive means for rotating said wheel against said record medium to move its surface in a direction opposite to the direction of movement of said record medium,
   in which said wheel comprises a reel with a hub and an easily replaceable velvet cover on said hub forming said soft, absorbent surface, and
   in which said cover comprises a sleeve with elastic borders at opposite ends.

14. A device for cleaning a thin elongated flexible record medium, said device comprising, in combination:
   a sprayer for spraying a liquid solvent onto a moving elongated flexible record medium at a first location,
   a wiping device for wiping said medium at a second location,
   drive means for driving said record medium sequentially past said first and second locations and air flow means for directing at least one thin stream of air against at least said one surface of said record medium onto which solvent has been sprayed and which has been wiped by said wiping device.

15. A device for cleaning a thin elongated flexible record medium, said device comprising, in combination:
   a sprayer for spraying a liquid solvent onto a moving elongated flexible record medium at a first location,
   a wiping device for wiping said medium at a second location,
   drive means for driving said record medium sequentially past said first and second locations,
   including a substantially air-tight housing in which said sprayer and wiping device as located, and solvent recovery means including a recovery still and exhaust means for removing solvent-containing air from said housing and sending said air to said recovery still.

16. A device for cleaning a thin elongated flexible record medium, said device comprising, in combination:
   a sprayer for spraying a liquid solvent onto a moving elongated flexible record medium at a first location,
   a wiping device for wiping said medium at a second location, and
   drive means for driving said record medium sequentially past said first and second locations,
   in which said sprayer is an airbrush supplied with said solvent and with compressed air.

17. A motion picture film cleaning device comprising, in combination:
   a first sprayer for spraying solvent onto a first substantially dry surface of said film at a first location,
   a first buffer located at a second location adjacent said first location for buffing said first surface of said film upon which said first sprayer has sprayed solvent,
   a second sprayer for spraying solvent onto the opposite side of said film at a third location downstream from said first and second locations,
   a second buffer adjacent said third location to buff said opposite side of said film upon which said second sprayer has sprayed solvent,
   a heated air blower for blowing heated air against said film after said sprayers and buffers have acted upon said film, and
   a drive device for moving said film past said sprayers, buffers and said blower.

18. A motion picture film cleaning device comprising, in combination:
- a first sprayer for spraying solvent onto a first surface of said film,
- a first buffer located adjacent said first sprayer for buffing said first surface of said film upon which said first sprayer has sprayed solvent,
- a second sprayer for spraying solvent onto the opposite side of said film,
- a second buffer adjacent said second sprayer to buff said opposite side of said film upon which said second sprayer has sprayed solvent,
- a heated air blower for blowing heated air against said film after said sprayers and buffers have acted upon said film,
- a drive device for moving said film past said sprayers, buffers and said blower, and
- air stream producing means located ahead of said blower in the path of movement of said film for directing a thin stream of air against said film at an acute angle opposite the direction of movement of said film.

19. A device as in claim 18 in which said air stream producing means produces two air streams directed against opposite sides of said film.

20. A motion picture film cleaning device comprising, in combination:
- a first sprayer for spraying solvent onto a first surface of said film,
- a first buffer located adjacent said first sprayer for buffing said first surface of said film upon which said first sprayer has sprayed solvent,
- a second sprayer for spraying solvent onto the opposite side of said film,
- a second buffer adjacent said second sprayer to buff said opposite side of said film upon which said second sprayer has sprayed solvent,
- a heated air blower for blowing heated air against said film after said sprayers and buffers have acted upon said film,
- a drive device for moving said film past said sprayers, buffers and said blower,
- in which said blower is an ionizing air amplifier and including an electrical heating element in the air stream output from said air amplifier, and including a drying enclosure positioned to pass said film therethrough, with an air distribution structure for directing air from said blower against said film in multiple streams flowing opposite to the direction of movement of said film.

21. A device as in claim 20 including means for directing said film through said drying enclosure a plurality of times.

22. A device for cleaning a thin elongated flexible record medium, said device comprising, in combination:
- means for cleaning said record medium with a liquid solvent, and a dryer for drying said record medium after being cleaned with said solvent, said dryer including an air stream ionizing device for sending a stream of ionized air for drying said medium and reducing static electricity on the surface of said medium and thus reducing electrostatic attraction of particles to the medium.

23. A device as in claim 22, said means for cleaning including,
- a sprayer for spraying a liquid solvent onto one surface of a moving elongated flexible substantially dry record medium at a first location,
- a wiping device for wiping said medium at a second location adjacent said first location, and
- drive means for driving said record medium past said locations.

24. A device as in claim 22 in which said deionizing device comprises an air stream creation device, an ionization device for ionizing air in said air stream, a heating device for heating the air in said stream, and means for directing said air stream against said record medium.

25. A device for cleaning a thin elongated flexible record medium, said device comprising, in combination:
- a sprayer for spraying a liquid solvent onto a moving elongated flexible record medium at a first location,
- a wiping device for wiping said medium at a second location,
- drive means for driving said record medium sequentially past said first and second locations and a heated air dryer for drying said one surface of said record medium after said one surface has been wiped by said wiping device, said dryer comprising a heated air flow source, a housing positioned to receive heated air from said source, said housing having at least one passageway for guiding said record medium through said housing, said passageway having multiple slots for forming plural heated air streams directed at said record medium as it passes through said housing.

26. A device as in claim 25 including a plurality of said passageways, and means for directing said record medium through said passageways in sequence.

27. A device as in claim 25 in which said slots form air streams impinging on said record medium at an acute angle.

* * * * *